United States Patent [19]

Yoshida et al.

[11] Patent Number: 4,958,178
[45] Date of Patent: Sep. 18, 1990

[54] COLLAPSIBLE MOUNTING TYPE CAMERA WITH ZOOM LENS

[75] Inventors: Toshio Yoshida; Masayoshi Hirai; Tetuo Nishizawa, all of Saitama; Masashi Takamura, Tokyo, all of Japan

[73] Assignee: Fuji Photo Film Co., Ltd., Kanagawa, Japan

[21] Appl. No.: 272,524

[22] Filed: Nov. 16, 1988

[30] Foreign Application Priority Data

Nov. 16, 1987 [JP] Japan ................................ 62-288839

[51] Int. Cl.⁵ .............................................. G03B 1/18
[52] U.S. Cl. ............................................... 354/195.12
[58] Field of Search .................. 354/187, 195.1, 195.12

[56] References Cited

U.S. PATENT DOCUMENTS

4,779,964 10/1988 Ozawa et al. .................... 354/187 X
4,789,875 12/1988 Wakabayashi et al. ........... 354/195.1

*Primary Examiner*—Brian W. Brown
*Attorney, Agent, or Firm*—Young & Thompson

[57] ABSTRACT

A camera with a zoom lens system having at least front and rear lens groups each comprising at least one lens, comprises a movable lens barrel holding the front lens group and being axially movable rearwardly and forwardly relative to a camera body and a moving mechanism for causing the axial movement of the movable lens barrel. The moving mechanism comprises a first cam member provided in the movable lens barrel and a rotatable lever coacting with the first cam member for causing the axial movement of the movable lens barrel, the first cam member having first and second straight cam sections for causing the axial movement of the movable lens barrel between front and rear axial positions and beyond the rear positions, respectively, and further comprises a second cam member provided in the camera body and a bell crank lever rotatably mounted on the movable lens barrel and coacting with the second cam member and the second lens group for shifting the rear lens group relative to the front lens group when the movable lens group is moved between the front and rear axial positions so as to change the zoom lens system between the longest and the shortest focal length and for moving the front and rear lens groups conjointly as a unit when the movable lens barrel is moved beyond the rear axial position, thereby collapsing the movable lens barrel at least almost fully within the camera body.

14 Claims, 8 Drawing Sheets

COLLAPSIBLE MOUNTING TYPE CAMERA WITH ZOOM LENS

BACKGROUND OF THE INVENTION

The present invention relates to a collapsible mounting type camera with a zoom lens in which a zoom lens barrel can be collapsed in the camera body when the camera is not in use.

In recent years, there have been marketed various kinds of compact cameras with zoom lenses of which the focal length can be continuously changeable. Such compact cameras are very convenient to take pictures of various subjects.

A zoom lens includes a lens barrel axially movable relative to the camera body to shift lenses of the zoom lens system. Conventional zooming mechanisms include inner and outer lens barrels, one secured to the camera body and the other rotatable about the axis of the zoom lens system to shift axially at least one lens of the zoom lens system in order to change the focal length of the zoom lens system. For the axial movement of the at least one lens, either one of the inner and outer lens barrels is formed with a straight guide groove parallel to the optical axis and the other with as many cam grooves as the lens groups of which the zoom lens system consists, these guide and cam grooves being all engaged by follower pins provided on a lens holder of each lens group. By rotating the one lens barrel relative to the other, the lens groups of the zoom lens system are controllably axially shifted by the cam grooves to change the focal length thereof.

Such a zoom lens system of the conventional compact cameras of the collapsible mount type is collapsed to its rearmost position, for example generally to a wide-angle photographic position, in the camera and is protected by a barrier incorporated in the camera when the camera is out of use. In general, the longer the lens barrel becomes at one extreme of its zooming range, the more difficult it becomes to collapse fully the lens barrel within the camera body.

In the above circumstances, the zoom lens barrel which projects partly from the camera body even in its rearmost position is relatively bulky and is inconvenient when carried in, for example, a handbag or briefcase. Moreover, when handling the uncovered camera, it is difficult to avoid striking the projecting part of the zoom lens barrel, damaging the same.

OBJECTS OF THE INVENTION

It is, therefore, an object of the present invention to provide a collapsible mount type compact camera with a zoom lens in which the zoom lens barrel is fully collapsed within the camera body when the camera is not in use.

It is another object of the present invention to provide a collapsible mount type compact camera of improved compactness and thinness, for convenience of handling and for storage.

SUMMARY OF THE INVENTION

The above and other objects of the present invention are achieved by providing a camera with a zoom lens which comprises a zoom lens system consisting of at least front and a rear lens groups, a movable lens barrel holding the front lens group, said barrel being axially movable back and forth relative to a camera body, and means for cooperatively shifting the movable lens barrel and the rear lens group. The cooperative shifting means comprises a first cam member provided in the movable lens barrel and a rotatable lever cooperating with the first cam member to cause axial movement of the movable lens barrel, the first cam member having first and second straight cam sections for causing axial movement of the movable lens barrel between front and rear axial positions and beyond the rear position, respectively. The shifting means further comprises a second cam member provided in the camera body and a bell crank lever rotatably mounted on the movable lens barrel and cooperating with the second cam member and the second lens group to shift the rear lens group relative to the front lens group when the movable lens group is moved between the front and rear axial positions so as to change the zoom lens system between the longest and the shortest focal lengths and to move the front and rear lens groups toward each other when the movable lens barrel is moved beyond the rear axial position, thereby collapsing the movable lens barrel almost fully within the camera body.

DETAILED DESCRIPTION OF THE INVENTION

Figure 1:
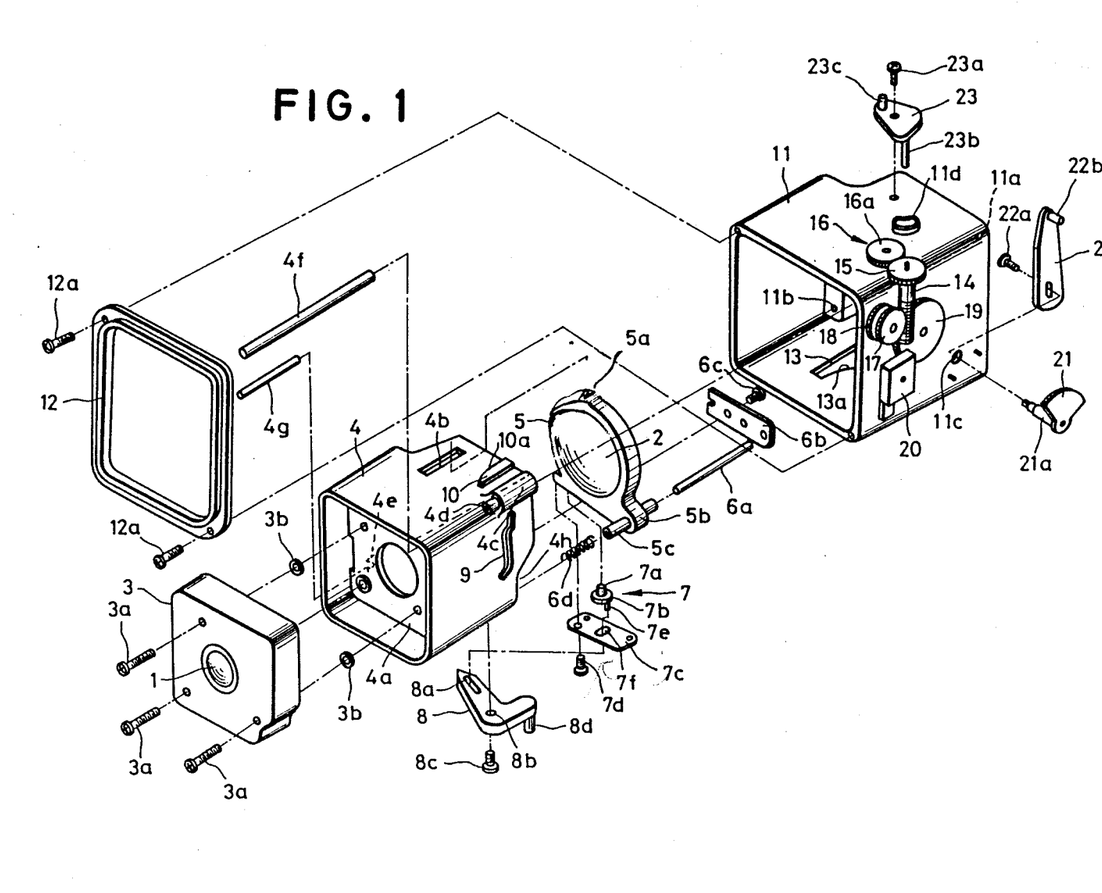
FIG. 1 is an exploded perspective view showing an essential part of a camera including a zoom lens system according to a preferred embodiment of the present invention.

Referring now to FIG. 1, there is shown a zoom lens drive mechanism incorporated in a camera according to a preferred embodiment of the present invention. As shown, a zoom lens system in the form of a taking lens comprises first and second lens means or lens groups 1 and 2, respectively, each comprising a single-element lens in this embodiment. The first lens group 1 is received in a shutter unit housing 3 attached to the inside surface of a movable lens barrel 4 with set screws 3a. In order to adjust the optical axis of the first lens group 1, there are provided spring washers 3b for two of the three sets screws 3a.

The movable lens barrel 4 is configured in the form of a rectangular pipe with a partition wall 4a to which the shutter unit housing 3 is attached. In the top wall of the movable lens barrel 4 there is formed a guide slot 4b parallel to the optical axis of the zoom lens system. The guide slot 4b slidably receives an upper projection 5a of a lens holder 5 holding the second lens group 2. The lens holder 5 has a lower projection 5b in which a bush 5c is fitted to receive slidably a guide rod 6a of which one end is supported by the partition wall 4a of the movable lens barrel 4 and the other end is held by a bracket 6b secured to the movable lens barrel 4 with a set screw 6c. Between the lens holder 5 and the partition wall 4a of the movable lens barrel 4 there is a coil spring mounted on the guide rod 6a to urge the lens holder 5 backward.

Figure 2:
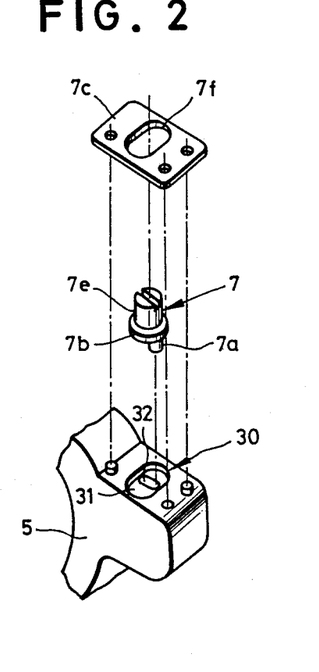
FIG. 2 is an exploded perspective view from below, showing a focus adjusting mechanism.
Figure 3:
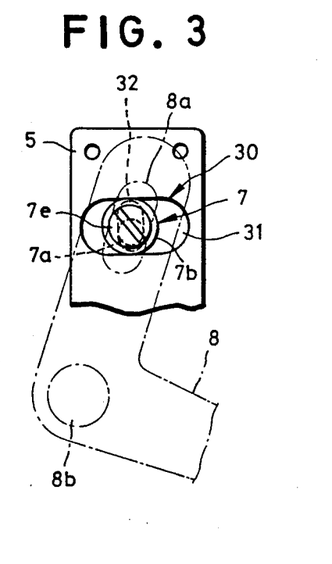
FIG. 3 is a bottom view showing the focus adjusting mechanism of FIG. 2.

In association with the lens holder 5, there is a focus adjustment means as is shown in FIGS. 2 and 3. The focus adjustment means includes a depressed recess 31 elongated in a direction parallel to the optical axis and having a center hole 32 perpendicular to the depressed recess 31 formed in the periphery of the lens holder. An adjusting member 7 is secured to the lens holder 5 by a plate 7c with set screws 7d in such a way as to retain rotatably a flange 7b and an off-set pin 7a of member 7 in the recess 31 of the center hole 32, respectively. An adjusting pin 7e of the adjustment member 7 coaxial relative to the flange 7b extends downwardly and passes through a hole 7f formed in the plate 7c and is slidably received in a slot 8a formed in a generally L-shaped bell crank lever 8 which is pivotally attached to the underside surface of the movable lens barrel 4 by means of a screw 8c that passes through hole 8b of the bell crank lever 8 and about which lever 8 pivots. The bell crank lever 8 is provided with a follower pin 8d extending downward.

A cam slot 9 is formed in a side wall of the movable lens barrel 4 and, as is shown in FIGS. 4 to 7, comprises a vertical straight zooming cam section 9a for zooming, an upper circular-arcuate cam section 9b having its center at an axis 21a of rotation of an input lever 22 for wide-angle photography, a lower circular-arcuate cam section 9c having its center at the axis 21a for telephotography, and a straight vertically extended cam section 9d extending upward from the zooming cam section 9a, all these cam sections being continuous in the sense of opening into each other. The wide-angle and telephotographic cam sections 9b and 9c place the zoom lens system in positions suitable for wide-angle photography and telephotography, respectively.

Referring again to FIG. 1, the movable lens barrel 4 is provided with a guide member 4c having a bush 4d with a bore along an upper ridge line thereof that is parallel to the optical axis. Close to the guide tube 4c the movable lens barrel 4 is provided with a cam plate 10 having a cam surface 10a formed on one side. It is to be noted that the cam plate 10 may be formed integral with the guide member 4c. In a lower portion of a wall of barrel 4 opposite to the wall in which the cam slot 9 is formed, there is a guide member 4e in the form of a U-channel or which can be of the same form as guide member 4c.

The movable lens barrel 4 thus constructed is supported by a square pipe-shaped fixed barrel 11 secured to the camera body A for axial movement parallel to the optical axis. For movably supporting the movable lens barrel 4, there are guide rods 4f and 4g passing through the bush 4d of the guide members 4c and 4e. The rear ends of the guide rods 4f and 4g are secured to a rear supporting lug 11a extending downward from the top wall of the fixed barrel 11 and a side supporting lug 11b extending laterally inward from the fixed lens barrel 11.

The fixed barrel 11 is provided with a square frame 12 at its front end attached there to with set screws 12a. The bottom wall of the fixed barrel 11 is formed with a cam groove 13 having a cam surface 13a on its one inner wall which is engaged by the follower pin 8d of the bell crank lever 8.

Figure 8:
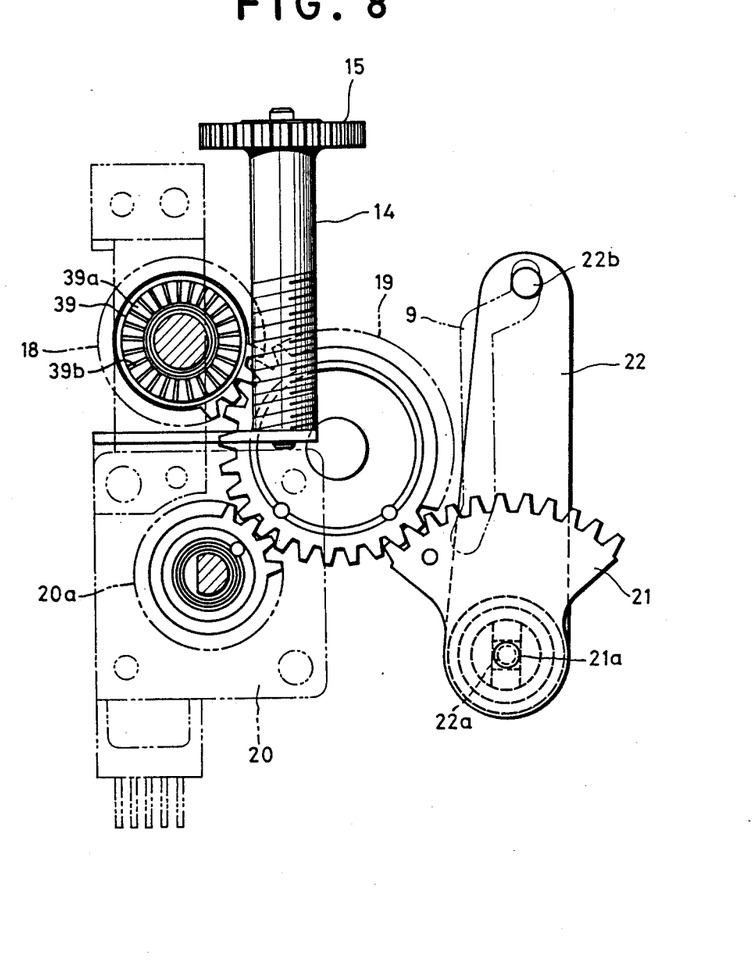
FIG. 8 is a cross sectional view of a part of a gear train connecting an electric motor and the shift mechanism of FIGS. 4 to 7.
Figure 9:
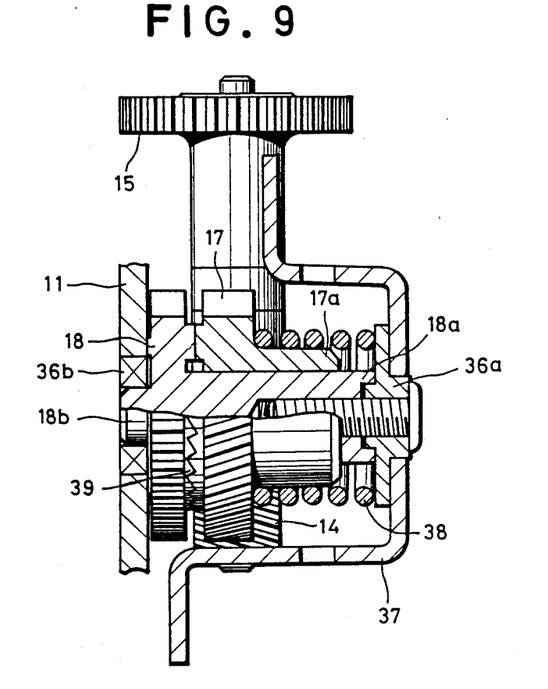
FIG. 9 is a view, with parts broken away, from the left of FIG. 8 and on an enlarged scale.

As is shown in FIGS. 1, 8 and 9, on the other side wall of the fixed barrel 11 there is a power train including a worm 14 having a vertical axis of rotation whose top end is above the top wall of the fixed barrel 11 and has attached thereto a spur gear 15 in mesh with a gear train 16 including a gear 16a which is provided on the top wall and transmits rotation from a motor (not shown) to the spur gear 15 with an appropriate reduction rate. In mesh with the worm 14 is a worm wheel 17 rotatably mounted on another side wall of the fixed barrel 11. A transmission gear 18 is provided on that other side wall coaxial with the worm wheel 17. The worm wheel 17 is usually frictionally coupled to the transmission gear 18 but one will stop while the other continues to rotate upon the application of a predetermined load between the worm wheel 17 and the gear 18.

Figure 10:
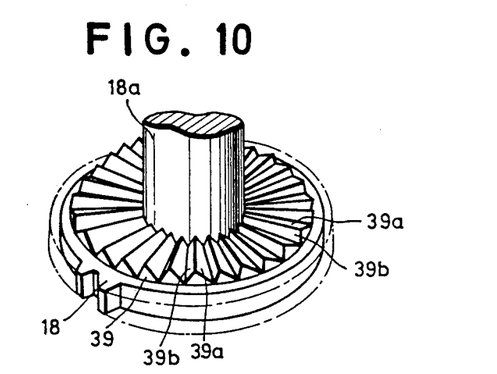
FIG. 10 is a perspective view showing a part of a friction clutch included in the gear train of FIG. 8.

FIGS. 9 and 10 show details of the power train. As is shown, the transmission gear 18 is integrally formed with a boss 18a of which one end is supported by a metal bearing 36a mounted on a bracket 37 secured to the fixed barrel 11. A journal 18b on the side of gear 18 opposite boss 18a is supported by a bearing 36b attached to the fixed barrel 11. The boss 18a of the transmission gear 18 has the worm wheel 17 mounted thereon so as to allow it not only to move along the axis of rotation of the transmission gear 18 but also to rotate independently from the transmission gear 18. Between the metal bearing 36a and the worm wheel 17 there is a coil compression spring 38 surrounding a boss 17a of the worm wheel 17 to force the worm wheel 17 against the transmission gear 18. The surfaces of the worm wheel 17 and the transmission gear 18 facing each other are formed with a number of radial ridges 39 formed by gentle slopes 39a and steep slopes 39b disposed alternately. Due to the provision of the radial ridges 39 the worm wheel 17 and the transmission gear 18 can be in mesh with each other. It is to be noted that the worm 14 and the worm gear 17 are so designed that the rotation of the motor is transmitted from the worm 14 to the worm wheel 17 but the worm wheel 17 cannot cause the rotation of the worm 14 because of the high load of the worm 14 with its associated elements. As is shown in FIG. 8, the transmission gear 18 is operationally coupled to both a sector gear 21 and a gear 20a for driving an encoder 20 through an intermediate gear 19.

As is seen in FIG. 1, a shaft 21a of the sector gear 21 passes through a bore 11c formed in the side wall of the fixed barrel 11 and a cut-away portion 4h of the movable lens barrel 4 and the end of shaft 21a is located inside the movable lens barrel 4 received in the fixed barrel 11. To the end of the shaft 21a, the lower end of the input lever 22 is secured with a set screw 22a, so as to synchronize the rotation of the sector gear 21 with that of the input lever 22. The input lever 22 is provided with a drive pin 22b oriented toward the sector gear 21, and this pin 22b is in slidable engagement with the cam slot 9 formed in the side wall of the movable lens barrel 4.

The top wall of fixed barrel 11 is formed with an opening 11d that overlies cam plate 10; and that top wall of barrel 11 is also provided with a cooperating plate 23 attached swingably thereto substantially at the center of the cooperating plate 23 with a set screw 23a. The cooperating plate 23 is provided with a follower pin 23b extending downward at one end which passes through the opening 11d and is forced to engage with the cam surface 10a of the cam plate 10 by means of a spring (not shown) and a pin 23c extending upward at the opposite end which coacts with a magnifying mechanism of a finder 40.

Figure 11:
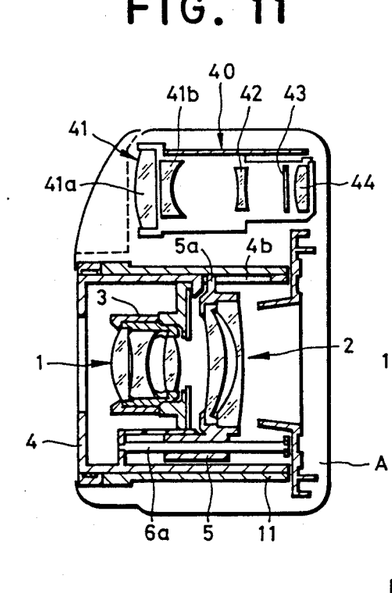
FIGS. 11 to 13 are cross sectional views showing a camera of FIG. 1 in which the zoom lens system is in various positions.
Figure 12:
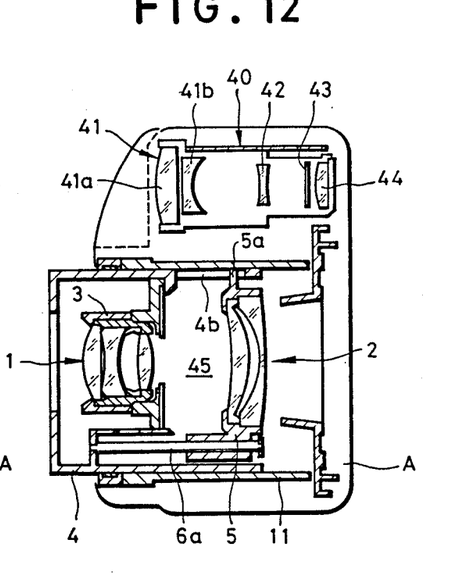
Figure 13:
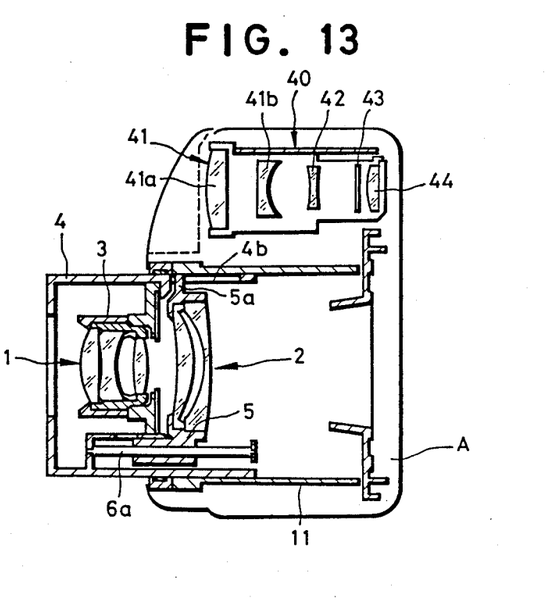

Referring now to FIGS. 11 to 13 showing the finder 40 which is incorporated in the camera body A above the fixed barrel 11, the finder optical system has an objective lens 41 comprising convex and axially movable concave lenses 41a and 41b, a reflective mirror 42, a view field frame 43 and an eyepiece lens 44 arranged in this order from front to back. The camera shown in FIG. 11 is not in use and the movable barrel 4 is fully retracted within the camera body A.

The camera shown in FIG. 12 is in a standard photographic mode in which the movable lens barrel 4 protrudes forwardly partway and the concave lens 41b of the objective lens 41 of the finder 40 is close to the convex lens 41a of the objective lens 41 of the finder 40.

The camera shown in FIG. 13 is in a telephotographic mode in which the movable lens barrel 4 fully protrudes forward, the second lens group 2 having been moved relative to the movable lens barrel 4 close to the first lens group 1, thereby moving back the concave lens 41b of the objective lens 41 of the finder 40 to a position substantially midway between the convex lens 41a of the objective lens 41 and the reflective mirror 42 of the finder 40.

Upon continuously changing the taking lens from a focal length suitable for standard photography to a focal length suitable for telephotography, the concave lens 41b of the objective lens 41 of the finder 40 progressively moves back from a position close to the convex lens 41a, shown in FIG. 12, toward the position showing in FIG. 13. The changing of focal length is effected by means of a mechanism for converting rotary motion of the cooperating plate 23 into linear motion of the concave lens 41b, such as a link mechanism or a rack and pinion mechanism, between the pin 23c of the cooperating plate 23 and the concave lens 41b. It is to be noted that the cooperating plate 23 may be rotatably supported by the camera body A or by the housing of the finder 40.

In operation of the collapsible mounting type camera with a zoom lens thus constructed, the motor rotates, rotating the spur gear 15, and hence the worm 14, through the gear train 16. The worm wheel 17 in mesh with the worm 14 rotates accordingly, forcing consequently the transmission gear 18 frictionally coupled to the worm wheel 17 to rotate. The rotation of the transmission gear 18 is transmitted to the sector gear 21 through the intermediate gear 19 so as to turn it in the counterclockwise direction as viewed in FIG. 4 about the axis of rotation of the sector gear 21. The direction of rotation in which the motor rotates to cause the sector gear 21 to turn in the counterclockwise direction is hereinafter referred to as the normal direction of rotation.

Figures 4, 5, 6, 7:
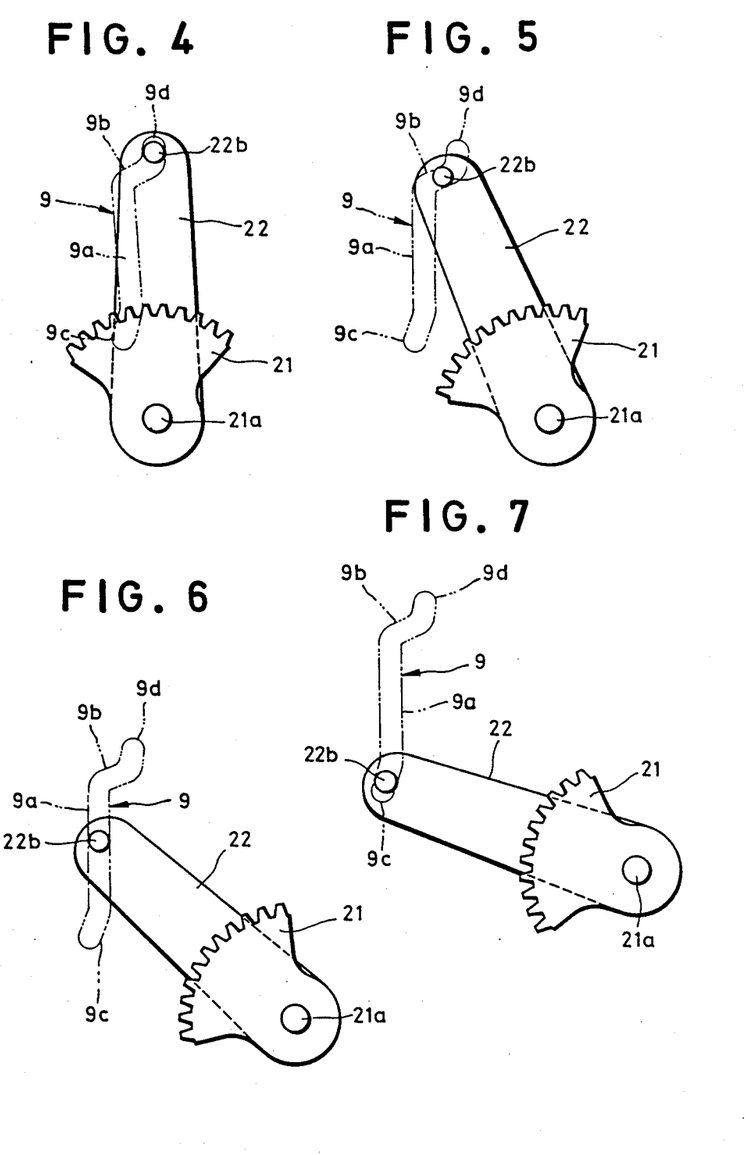
FIGS. 4 to 7 are explanatory illustrations showing a shift mechanism for cooperatively shifting a movable lens barrel and a rear lens group of a zoom lens system into various shifted positions.

As a result of the counterclockwise rotation of the sector gear 21, the input lever 22 coaxial with the sector gear 21 turns simultaneously in the counterclockwise direction so as to move the drive pin 22b in the counterclockwise direction along the cam slot 9 as viewed in FIG. 4, along a circular path having its center at the axis 21a of rotation of the sector gear 21. Specifically, when the drive pin 22b moves along the cam slot 9 starting from the vertically extended cam section 9d, it forces the movable lens barrel 4 with the first lens group 1 and the shutter unit housing 3 to move forward relative to the fixed barrel 11 along the guide member 4c and the guide rod 4g. It will be apparent that the distance by which the movable lens barrel 4 moves forward depends on the length of the vertically extended cam section 9d. In this embodiment, since the cam section 9d is short, the distance that the movable lens barrel 4 moves forwardly is also short.

When the motor continues to rotate in the normal direction, the drive pin 22b of the input lever 22, as is shown in FIG. 5, enters into the wide-angle photography cam section 9b which is, as was previously described, a part of a circle having its center at the axis 21a of rotation of the sector gear 21. The movable lens barrel 4 will be brought to a standstill while the drive pin 22b moves along the wide-angle photographic cam section 9b.

Figure 14:
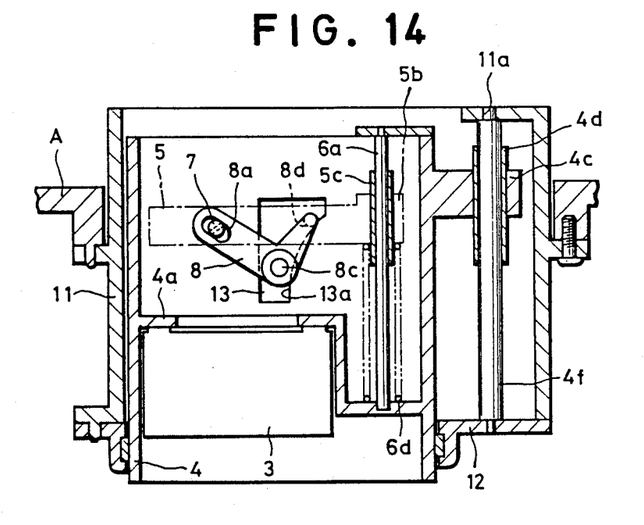
FIGS. 14 to 16 are cross sectional views showing the camera of FIGS. 11 to 13 taken in a horizontal plane and in which the zoo lens system is in various positions.
Figure 15:
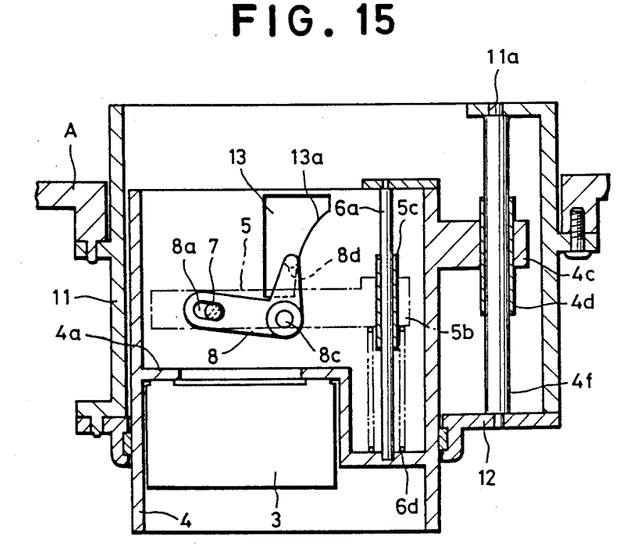
Figure 16:
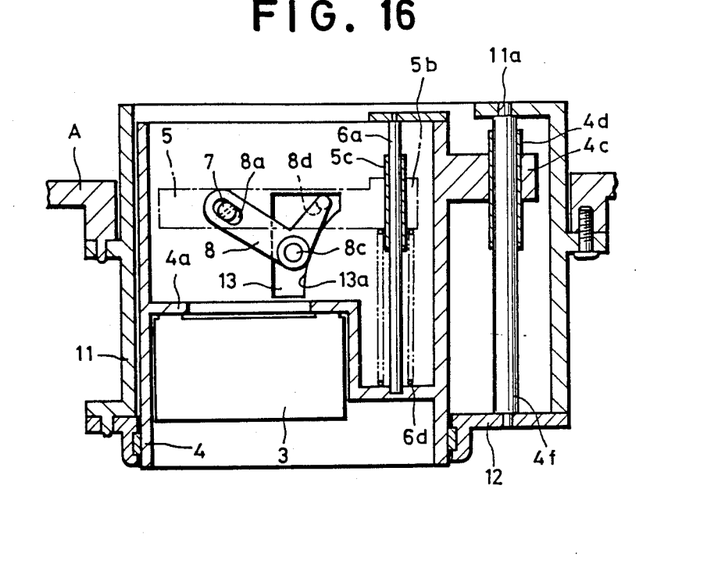

As will be apparent, when the drive pin 22b enters the zooming cam section 9a as is shown in FIG. 6, it moves forwardly the movable lens barrel 4 relative to the fixed barrel 11 to shift forwardly the first lens group 1 of the taking lens system relative to the second lens group 2. With the forward movement of the movable lens barrel 4 relative to the fixed barrel 11, the bell crank lever 8 rotatably mounted on the movable lens barrel 4, of which the follower pin 8d is in engagement with the cam surface 13a of the cam groove 13 of the fixed barrel 11, turns in the counterclockwise direction as viewed in FIG. 14 about the set screw 8c. On the other hand, because the bell crank lever 8 is linked to the lens holder 5 holding the second lens group 2 through the adjusting pin 7, the bell crank lever 8 turning in the counterclockwise direction forces forwardly the lens holder 5 relative to the movable lens barrel 4 against the action of the coil spring 6d. As a result, as is shown in FIG. 15, the second lens group 2 moves forwardly relatively to the movable lens barrel 4 so as to be brought closer to the first lens group 1, thereby to change continuously the focal length of the taking lens system according to the curve of the cam surface 13a of the cam groove 13 for zooming in.

With a further forward movement of the movable lens barrel 4, the input lever 22 turns further in the counterclockwise direction and then causes the drive pin 22b to enter the telephotographic cam section 9c which is a part of a circle having its center at the axis 21a of rotation of the sector gear 21 as is shown in FIG. 7. While the drive pin 22b is in the telephotographic cam section 9c, no more forward movement of the movable lens barrel 4 is caused even though the input lever 22 continuously turns. At this time, the movable lens barrel 4 is at its forwardmost position protruding from the fixed barrel 11.

On the contrary, when the motor is turned in the reverse direction, the movable lens barrel 4 is collapsed. Specifically, the turning of the motor in the reverse direction forces the sector gear 21, and hence the input lever with the drive pin 22b in the telephotographic cam section 9c of the cam slot 9, to turn in the clockwise direction as viewed in FIG. 7, moving back the movable lens barrel 4 into the fixed barrel 11.

The lens holder 5 is continuously urged rearward by the coil spring 6d and the bell crank lever 8 with the adjusting member 7 coacting with the lens holder 5 is forced to bring the follower pin 8d into contact with the cam surface 13a of the cam groove 13. The bell crank lever 8 is forced to turn in the clockwise direction about the screw 8c as viewed in FIG. 14 upon the retracting movement of the movable lens barrel 4, moving the adjusting pin 7e of the adjusting member 7 in the same direction to shift rearwardly the lens holder 5 relative to the movable lens barrel 4. In this way, the first and second lens groups 1 and 2 move back independently of each other to change continuously the focal lengths of the taking lens system between those suitable for telephotography and for wide-angle photography. When the first and second lens groups 1 and 2 have moved back to the rearmost retracted position for providing a focal length suitable for wide-angle photography, they are disposed with the greatest distance 45 therebetween as seen in FIG. 12.

The rotation of the intermediate gear 19, which causes the back and forth movement of the movable lens barrel 4, is transmitted to the encoder 20 through the gear 20a and causes it to operate. When the movable lens barrel 4 is brought to a standstill, the encoder 20 also stops, to indicate the position where the movable lens 4 stops. According to the indication of the encoder 20, an exposure control is effected.

Upon the back and forth movement of the movable lens barrel 4, the cooperating plate 23, of which the follower pin 23b is in contact with the cam surface 10a of the cam plate 10, will turn in the counterclockwise or clockwise direction. The turning of the cooperating plate 23 is transmitted to the concave lens 41b of the objective lens 41 of the finder 40 through the motion magnifying mechanism so as to move it backwardly or forwardly when the movable lens barrel 4 moves forwardly or backwardly, respectively, in order to change continuously the magnification of the optical system of the finder 40 according to the changed focal lengths of the taking lens system.

If a large external force is accidentally exerted on the protruding movable lens barrel 4, as when the camera receives an impact, the movable lens barrel 4 is forced to move back, forcing the sector gear 21 to turn in the clockwise direction in FIG. 6 or 7. As a result, the sector gear 21 rotates the intermediate gear 19 and hence the transmission gear 18. On the other hand, since the worm wheel 17 in engagement with the transmission gear 18 through the radial ridges 39 thereof is in mesh with the worm 14 acting as a load against the worm wheel 17, it cannot rotate. The worm wheel 17 accordingly slides to the right as viewed in FIG. 9 against the action of the coil spring 38, so that the radial ridges 39 of the worm wheel 17 override the radial ridges 39 of the transmission gear 18, disconnecting the worm wheel 17 and the transmission gear 18 from each other. Once these radial ridges 39 of the worm wheel 17 override the ridges of the transmission gear 18, the worm wheel 17 is forced to slide back to the left as viewed in FIG. 9 by the coil spring 38, bringing these radial ridges 39 into engagement with each other again to connect the worm wheel 17 with the transmission gear 18. The radial ridges of the worm wheel 17 and transmission gear 18 repeatedly engage and disengage, causing the transmission gear 18 to turn relative to the worm wheel 17 so as to allow the movable lens barrel 4 to move back.

In the case of carelessly pulling out the movable lens barrel 4 from the rearmost collapsed position, although the sector gear 21 is turned by the movable lens barrel 4 and causes the transmission gear 18 to rotate, the worm wheel 17 is at a standstill, allowing the transmission gear 18 to turn and the movable lens barrel 4 to move forwardly.

If the transmission gear 18 is prevented from rotating while the motor is rotating in order to move backwardly or forwardly the movable lens barrel 4, as when the movable lens barrel 4 reaches the forward or rearward extremity of its range of movement or when the movable lens barrel 4 is obstructed from moving backwardly or forwardly, the worm wheel 17 will turn relative to the transmission gear 18, which prevents the various elements in the power train from being damaged.

In any case, the intermediate gear 19 will rotate to rotate the gear 20a of the encoder 20. The indicia of the encoder 20 show the position of the movable lens barrel 4 which has moved due to an external force. The cooperating plate 23 is also turned in cooperation with the backward or forward movement of the movable lens barrel 4, shifting backwardly and forwardly the concave lens 41b of the optical system of the finder 40 and placing it in a position wherein the optical system of the finder 40 has a magnification corresponding to that focal length of the taking lens which results from the movable lens barrel 4 being positioned. Thereafter, the movable lens barrel 4 is moved without any trouble when the motor rotates normally.

When the movable lens barrel 4 moves backwardly or forwardly, it will likely be subjected to a reaction force exerted by the follower pin 23b of the cooperating plate 23 on the cam plate 10 through the cam surface 13a and therefore tends to incline with respect to the guide rod 4f. However, since the cam plate 10 is located close to the guide member 4c with a guide bush 4d, the movable lens barrel 4 can move smoothly without being dependent on the reaction force received by the cam plate 10. It will be apparent that the closer the cam plate 10 is located to the guide member 4c, the more smoothly and certainly the movable lens barrel 4 moves.

Reference is again had to FIGS. 2 and 3 for giving a description of the initial adjustment of focus of the zoom lens system. After having provisionally fixed the position of the second lens group 2 relative to the bell crank lever 8, the adjusting pin 7e of the adjusting member 7 is turned through an appropriate angle to turn the off-set pin 7a slidably received in the radially extending depressed center hole 32 about the axis of rotation of the adjusting pin 7e, so as to press against the inner surface of the center hole 32, thereby causing the lens holder 5 to shift axially relative to the flange 7b of the adjusting member 7 received in and slidably guided by the recess 31 parallel to the optical axis. At this time, since the adjusting pin 7e of the adjusting member 7 only turns in the slot 8a of the bell crank lever 8, the distance between the axis of rotation of the bell crank lever 8 and the adjusting pin 7e is unchanged. In this way, the second lens group 2 is located at a desired axial position relative to the first lens group without changing the distance between the axis of rotation of the bell crank lever 8 and the adjusting pin 7e, so as to adjust the focus of the zoom lens system. After this focus adjustment, the set screw 7d is tightened to clamp the adjusting member 7 by the plate 7c.

Although the present invention has been described in association with a collapsible type camera with a telephotographic type zoom lens in which the first and second lens groups are moved forwardly to provide a long focal length, it is applicable to a collapsible type camera with a retrofocus type zoom lens in which first and second lens groups are moved backwardly to provide a long focal length.

What is claimed is:

1. A camera with a zoom lens comprising:
   a zoom lens system having at least front and rear lens means having a common optical axis;
   a movable lens barrel holding said front lens means and being axially movable rearwardly and forwardly relative to a camera body;
   means for causing said axial movement of said movable lens barrel while changing the relative position between said front and rear lens means by cooperatively shifting said rear lens means along said axis relative to said front lens means between first and second positions in both of which positions said rear lens means lies on said axis so as to change said zoom lens system between the longest and the shortest focal length respectively, said causing means permitting said movable lens barrel to be moved rearwardly beyond a position wherein said zoom lens system provides said shortest focal length while maintaining said rear lens means in said second position, thereby allowing said movable lens barrel to retract at least almost fully within said camera body; and
   means preventing rotation of said movable lens barrel and said front and rear lens means during said axial movements thereof.

2. A camera with a zoom lens comprising:
   a zoom lens system having at least front and rear lens means having a common optical axis;
   a movable lens barrel holding said front lens means and being axially movable rearwardly and forwardly relative to a camera body; and
   means for causing said axial movement of said movable lens barrel while changing the relative position between said front and rear lens means by cooperatively shifting said rear lens means along said axis relative to said front lens means between first and second positions in both of which positions said rear lens means lies on said axis so as to change said zoom lens system between the longest and the shortest focal length respectively, said causing means permitting said movable lens barrel to be moved rearwardly beyond a position wherein said zoom lens system provides said shortest focal length while maintaining said rear lens means in said second position, thereby allowing said movable lens barrel to retract at least almost fully within said camera body;
   said causing means comprising a first cam member provided in said movable lens barrel and extending generally perpendicular to the direction in which said movable lens barrel moves, a rotatable lever coacting with said first cam member for causing said axial movement of said movable lens barrel, a second cam member provided in said camera body and extending generally parallel to said direction, and a bell crank lever rotatably mounted on said movable lens barrel and coacting with said second cam member and said second lens means to move said second lens means relative to said first lens means.

3. A camera as defined in claim 2 wherein said first cam member has a first straight cam section extending perpendicular to said direction for causing said axial movement of said movable lens barrel so as to change said zoom lens between said longest and shortest focal lengths and a second straight cam section parallel to said first straight cam section for causing said axial movement of said movable lens barrel beyond said position wherein said zoom lens system provides said shortest focal length, and said second cam member has a cam section for causing said bell crank lever to rotate so as to shift said second lens means and a straight section parallel to said direction for leaving said bell crank stationary.

4. A camera as defined in claim 3, wherein said first cam member has an arcuate cam section connecting said first and second straight cam sections, said arcuate cam section being a part of a circle having its center on the axis of rotation of said rotatable lever.

5. A camera as defined in claim 4, wherein said arcuate cam section places said movable lens barrel at an axial position wherein said zoom lens system provides said shortest focal length.

6. A camera as defined in claim 5, wherein said shortest focal length is a focal length suitable for wide-angle photography.

7. A camera as defined in claim 2, wherein said rotatable lever is rotated by means of an electric motor.

8. A camera as defined in claim 7, wherein said rotatable lever and said electric motor are connected through a gear train.

9. A camera as defined in claim 8, wherein said gear train includes friction clutch means.

10. A camera as defined in claim 8, wherein said gear train includes a worm and a worm wheel.

11. A camera as defined in claim 10, wherein said gear train includes a friction means coacting with said worm wheel.

12. A camera with a zoom lens comprising:
    a zoom lens system having at least front and rear lens means having a common optical axis;
    means for moving said front and rear lens means along said axis in a predetermined optical relationship with each other so as continuously to change the focal length of said lens system;
    means for releasing said front and rear lens means from said predetermined optical relationship in a first position wherein said rear lens means is fully moved rearwardly;
    means for thereafter moving said front lens means relative to said rear lens means into a second position closer to said first position of said rear lens means; and
    means preventing rotation of said front and rear lens means during movement thereof.

13. A camera as defined in claim 12, further comprising means for releasably maintaining said front lens means in said second position closer to said rear lens means.

14. A camera with a zoom lens comprising:
    a zoom lens system having at least front and rear lens means having a common optical axis;
    means for moving said front and rear lens means along said axis in a predetermined optical relationship with each other so as continuously to change the focal length of said lens system;
    means for releasing said front and rear lens means from said predetermined optical relationship;
    means for moving said front lens means rearwardly beyond a position wherein said zoom lens system has the shortest focal length while maintaining said rear lens means stationary; and
    means preventing rotation of said front and rear lens means during movement thereof.

* * * * *